United States Patent
Pousada Carballo et al.

(10) Patent No.: US 6,393,254 B1
(45) Date of Patent: May 21, 2002

(54) DISABLER FOR MOBILE COMMUNICATIONS

(75) Inventors: José Maria Pousada Carballo, Pontevedra; Francisco Javier Gonzalez Castaño; Fernando Guillermo Isasi De Vicente, both of Vigo, all of (ES)

(73) Assignees: José María Pousada Carballo, Pontevedra; Francisco Javier González Castaño; Fernando Guillermo Isasi de Vicente, both of Vigo; José Fabián Plaza Fernández, Madrid, all of (ES); Robert Ricardo Meyer, Madison, WI (US)

( * ) Notice: Subject to any disclaimer, the term of this patent is extended or adjusted under 35 U.S.C. 154(b) by 0 days.

(21) Appl. No.: 09/644,482

(22) Filed: Aug. 23, 2000

Related U.S. Application Data

(63) Continuation of application No. PCT/ES99/00048, filed on Feb. 24, 1999.

(30) Foreign Application Priority Data

Feb. 26, 1998 (ES) ................................................ 9800473

(51) Int. Cl.$^7$ ................................................ H04K 3/00
(52) U.S. Cl. ............................................. 455/1; 455/88
(58) Field of Search .............................. 455/1, 88, 422, 455/69, 522

(56) References Cited

U.S. PATENT DOCUMENTS

| | | | | | |
|---|---|---|---|---|---|
| 2,885,543 | A | * | 5/1959 | Williams | 455/1 |
| 4,103,236 | A | * | 7/1978 | Deserno et al. | 455/1 |
| 4,498,193 | A | * | 2/1985 | Richardson | 455/1 |
| 5,001,771 | A | * | 3/1991 | New | 455/1 |
| 5,295,180 | A | * | 3/1994 | Vendetti et al. | 455/456 |
| 5,564,074 | A | * | 10/1996 | Juntti | 455/69 |
| 6,112,052 | A | * | 8/2000 | Guthrie et al. | 455/1 |

* cited by examiner

Primary Examiner—Nguyen T. Vo
(74) Attorney, Agent, or Firm—Craig A. Fieschiko, Esq.; DeWitt Ross & Stevens S.C.

(57) ABSTRACT

The object of the call masking system for mobile telephones is to prevent the operation of mobile telephones which are present in a closed environment without interfering with the normal operation of other telephones which are outside the closed environment. To this effect, the system generates interference signals which will prevent the mobile telephones from receiving the signaling channels sent by the base stations (for example, GSM call signaling channel). The system monitors the power with which the carriers of the neighboring base stations are received inside the room and will adjust the interference power radiating in the signaling channels so that the carrier to interference signal ratio will make the operation of the mobile telephones impossible. The system can be applied to closed environments wherein mobile telephones should not ring when receiving a call.

17 Claims, 1 Drawing Sheet

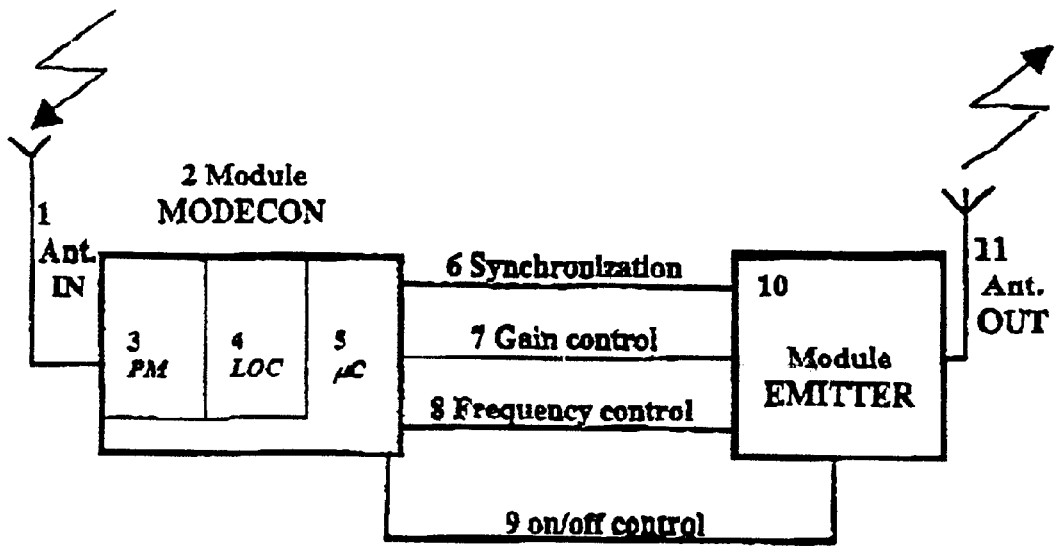
Figure 1. Disabler
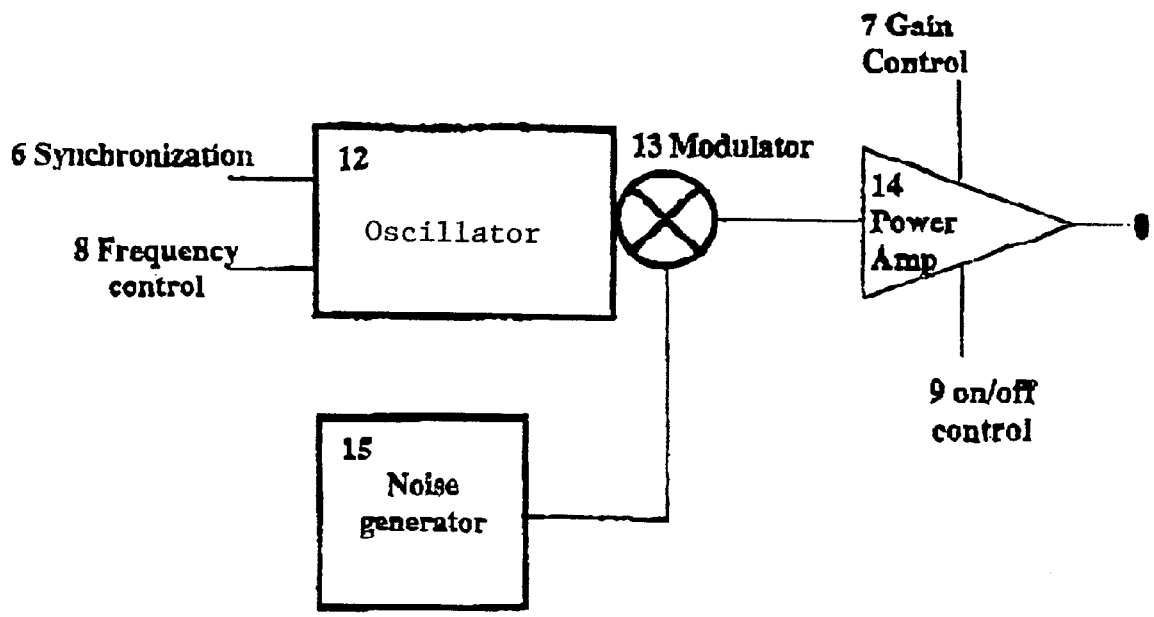
Figure 2. Interference generator module EMITTER (10)

DISABLER FOR MOBILE COMMUNICATIONS

CROSS-REFERENCE TO RELATED APPLICATIONS

This application is a continuation under 35 USC §365(c) of PCT Application PCT/ES99/00048 filed Feb. 24, 1999, the entirety of which is incorporated by reference herein. This PCT application in turn claims priority to Spanish patent application P 9800473 filed Feb. 26, 1998, the entirety of which is also incorporated by reference herein.

FIELD OF THE INVENTION

The invention relates generally to the field of telecommunications, and more specifically to the field of mobile communications, e.g., cellular telephones.

BACKGROUND OF THE INVENTION

U.S. Pat. No. 5,295,180 describes a system to generate zone identification signals for mobile communication systems. Terminals know zone identity by analyzing a signal emitted by a mark transmitter. This system includes the possibility in which, in case of zone overlapping, one of the mark transmitters has a higher priority, and can interfere with the signal of the others. In other words, the system uses interfering signals to define influence areas of mark transmitters.

However, the purpose of this system is not the disabling of terminals present in a given zone, and it does not take into account propagation properties in closed spaces, in order to generate interfering signals. Because of these reasons, it cannot be used to disable calls in closed spaces, neither in an indiscriminate nor in a selective way.

In the military, and for electronic war applications, there are devices that detect and jam enemy systems, such as radar or communications. Also in the military context, there are indiscriminate interference generators to disable devices that activate bombs remotely.

SUMMARY OF THE INVENTION

The disabler for mobile communications devices (e.g., cellular telephones) is a device to be placed in an enclosed area, whose functionality consists of: (a) detecting the existence of carrier signals from any mobile communications base station containing signaling channels; (b) measuring the carrier signal level; and (c) generating noise signals to affect these signaling channels. When the noise signals mask or "jam" the detected carriers, no mobile terminal/telephone present in the enclosed area will be able to receive the signaling information from the base station that generated it. As a consequence, incoming call alarms directed to the user of the mobile terminal/telephone are blocked.

Therefore, the main advantage of this system is that mobile terminal activity is disabled, independently of whether the user has it turned on or off, in enclosed areas in which incoming call alarms are a nuisance or where terminal activity may cause trouble. The disabler is tuned in such a manner that its interference signals will not have an effect outside the enclosed area where the device is installed.

BRIEF DESCRIPTION OF THE DRAWINGS

FIG. 1 is a diagram of a preferred embodiment of the invention.

FIG. 2 is a diagram of the emitter of FIG. 1.

DETAILED DESCRIPTION OF PREFERRED EMBODIMENTS OF THE INVENTION

The system will be able to generate interfering signals that degrade the carrier-to-noise ratio at the mobile terminal input. As a consequence, mobile terminals will not receive signaling channels from base stations. In other words, the disabler generates an artificial shadow region in places where mobile terminals would normally operate. The following preferred embodiments of the invention may be used to achieve this effect.

In a basic embodiment of the invention, the disabler will have circuitry which performs the following steps:
1. Detect carriers emitted by base stations, and measure their power level.
2. Identify which ones among them include signaling channels, e.g., BCCH, SACH, PCH, etc. in GSM (Global System for Mobile communications).
3. Identify the location of those channels in time, frequency and/or code.
4. Generate noise signals in those channels to mask those channels, with the noise signal power level being adjusted as desired.

FIG. 1 shows a complete block diagram of the system, which includes a detection and control module denoted MODECON (2), an interference generator module EMITTER (10, shown in greater detail in FIG. 2) and two antennas, an IN (receiving) antenna (1) and an OUT (emitting) antenna (11).

D Module MODECON (2) includes:
a) Control unit $\mu$C (5), which controls the whole system.
b) Carrier power level detector PM (3), to measure the power level of incoming carriers arriving from nearby base stations.
c) Carrier signaling channel detector/locator LOC (4), to detect/locate signaling channels within the carriers. The signaling channels are characterized by a carrier frequency and a channel synchronization signal (e.g., a time, frequency, and/or code slot).

The interference generator EMITTER (10) will generate interference signals corresponding to carrier signaling channels. For each interference signal, an interference generator EMITTER (10), such as the one in FIG. 2, is necessary. The exemplary EMITTER (10) includes:
a) A noise generator (15), to generate a base band noise signal. Exemplary noise signals include those generated by a polynomial pseudo-random noise generator, or a triangular wave generator.
b) An oscillator, e.g., a PLL (phase-locked loop) frequency generator, denoted (12) and controlled by MODECON (2), by means of a frequency control signal (8) and a synchronization signal (6).
c) A frequency modulator (13).
d) A power amplifier (14), also controlled by module MODECON (2):
  (1) In gain (7), to set the interference signal power level so that the carrier-to-interference ratio does not allow mobile terminal operation (typically 0 dB).
  (2) In on/off (9) (i.e., in duration), to stop interference signal generation while carrier power level detector PM (3) performs signal level measurement for carriers containing signaling channels. The measurement will be updated periodically, with one second measurement intervals generally being sufficient.

The disabler also includes a pair of antennas:
a) An IN (receiving) antenna (1), to receive base station carriers.
b) An OUT (emitting) antenna (11), to emit interference signals.

As an additional safeguard, directive antennas can be used to confine the influence of the disabler inside the target area.

In basic embodiments, the disabler may be used in areas that receive carriers from only a single base station. In this case, one of those carriers contains signaling channels, and therefore only a single interference generator module EMITTER (10) is necessary.

In places that receive several carriers from different base stations, the system may have a single MODECON (2) module and as many interference generator modules EMITTER (10) as necessary.

It is desirable to ensure that the disabler will not affect mobile terminals located outside the target area. The interference level emitted by the disabler is related to the carrier level as received inside the target area, with the interference level being sufficiently high that terminals are disabled. The system should not interfere with mobile terminals located outside the target area. To achieve this, the carrier-to-interference ratio at the input of an external mobile terminal, $K_r$, should be typically 20 dB higher than the same ratio for a terminal inside the enclosed target area.

(1) Assume that in a given moment there are n active carriers with signaling channels in the neighborhood of the disabler.
(2) Then assume that user/traffic channels and signaling channels are organized in a series of multiplexes, which modulate each of the n active carriers.
(3) The resulting bandwidth of a modulated carrier i is $B_i$, i=1 . . . n.
(4) Define $P_i$ as the minimum power level associated with the level of modulated carrier i which disables reception outside the target area.
(5) At the ith interference generator module EMITTER (10), $c_g^i$ is defined as the gain control (7) of its power amplifier (14), selected by control unit $\mu C$ (5), and $N_i(c_g^i)$ is defined as the level of the interference signal measured at the output of module EMITTER (10), across bandwidth $N_i$, during the signaling time slot of the signaling channels. $N'_i$ is the power level produced by EMITTER (10) outside the target area.
(6) Let L be losses due to walls surrounding the target area (typically higher than 10 dB), and let OA be the interference signal attenuation outside the target area due to the directivity of antenna OUT (11).

It must hold that: $K_r = P_i - N'_i$.
Since $N_i = P_i - L$
and $N'_i = N_i - L - OA$,
then: $K_r = P_i - N'_i = P_i - (N_i - L - OA) = P_i - (P_i - L - L - OA)$
and, as a consequence, $K_r = 2*L + OA$.

Since OA>0 dB and L≧10 dB, it is guaranteed that a mobile terminal located outside the target area should work normally, because $K_r \geq 20$ dB.

It should be understood that preferred versions of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims.

What is claimed is:

1. A mobile communications terminal disabler comprising:
   a. a receiving antenna wherein carrier signals are received, at least one carrier signal being characterized by:
      (1) a frequency, and
      (2) a channel synchronization signal;
   b. a control module including:
      (1) a carrier power level detector coupled to the receiving antenna, wherein the power level of each carrier signal is determined, and
      (2) a carrier signal detector coupled to the receiving antenna, wherein the carrier power level detector and carrier signal detector are periodically operative during carrier measurement periods, the carrier measurement periods being spaced by jamming periods;
   c. an emitter comprising:
      (1) a frequency generator wherein generator signals are generated, each generator signal being generated in accordance with the frequency and channel synchronization signal of the carrier signal;
      (2) a noise generator;
      (3) a modulator wherein the generator signal is modulated with the noise output of the noise generator;
      (4) a power amplifier wherein the modulated generator signal is amplified in accordance with
         (a) the power level of its underlying carrier signal, and
         (b) the jamming periods, with the amplification being active during the jamming periods and inactive during the carrier measurement periods;
         thereby producing an interference signal;
      (5) an emitting antenna from which the interference signal is emitted.

2. The mobile communications terminal disabler of claim 1 wherein the carrier signal detector selectively detects predefined carrier signals.

3. The mobile communications terminal disabler of claim 1 wherein the frequency and channel synchronization signal of the generator signal may be manually set by a user, and wherein the modulated generator signal may be manually amplified by a user.

4. A mobile communications terminal disabler for interfering with carrier signals, at least one carrier signal being characterized by a signal frequency and one or more channel synchronization signals, the disabler comprising:
   a. a frequency generator wherein generator signals are generated, each generator signal being automatically generated in accordance with the frequency and channel synchronization signals of the carrier signal;
   b. a modulator wherein the generator signal is modulated with noise;
   c. an amplifier wherein the modulated generator signal is automatically and periodically amplified in accordance with the power level of its underlying carrier signal, the amplification:
      (1) being active during jamming periods to thereby produce an interference
      (2) being inactive during carrier measurement periods, wherein the carrier measurement periods are spaced by the jamming periods,
   wherein the channel synchronization signals are selected within the frequency generator to generate an interference signal from the amplifier which interferes with signaling channels related to call reception, but wherein no interference signals are generated which interfere with call generation.

5. The mobile communications terminal disabler of claim 4 wherein the generator signal may be manually set by a user, and wherein the modulated generator signal may be manually amplified by a user.

6. The mobile communications terminal disabler of claim 5 wherein the frequency of the generator signal is selected to generate an interference signal interfering with carrier signals related to call reception, but wherein no interference signals are generated which interfere with call generation.

7. The mobile communications terminal disabler of claim 4 further comprising:

a. a carrier power level detector wherein the power level of each carrier signal is determined, the carrier power level detector providing a signal to the amplifier corresponding to the carrier signal power level; and b. a carrier signal detector providing signals to the frequency generator corresponding to:
   (1) the frequency of each detected carrier signal, and
   (2) the channel synchronization signals of each detected carrier signal, wherein the carrier power level detector and carrier signal detector are operative during the carrier measurement periods.

8. The mobile communications terminal disabler of claim 4 further comprising an emitting antenna from which the interference signal is emitted.

9. The mobile communications terminal disabler of claim 4 further comprising a receiving antenna wherein the carrier signals are received.

10. The mobile communications terminal disabler of claim 9 further comprising:
   a. a carrier power level detector coupled to the receiving antenna, wherein the power level of each carrier signal is determined, and
   b. a carrier signal detector coupled to the receiving antenna, wherein the carrier power level detector and carrier signal detector are operative during the carrier measurement periods.

11. The mobile communications terminal disabler of claim 10 wherein the carrier signal detector selectively detects one or more predefined channel synchronization signals.

12. The mobile communications terminal disabler of claim 10 wherein the carrier signal detector selectively detects predefined carrier signals.

13. A mobile communications terminal disabler comprising:
   a. a receiving antenna wherein carrier signals are received, at least one carrier signal being characterized by:
      (1) a frequency, and
      (2) one or more channel synchronization signals;
   b. an emitter comprising:
      (1) a frequency generator wherein generator signals are generated, each generator signal being generated in accordance with the frequency and channel synchronization signals of the carrier signal;
      (2) a noise generator;
      (3) a modulator wherein the generator signal is modulated with the noise output of the noise generator;
      (4) a power amplifier wherein the modulated generator signal is periodically amplified in accordance with the power level of its underlying carrier signal, the amplification:
         (a) being active during jamming periods to thereby produce an interference signal, and
         (b) being inactive during carrier measurement periods, wherein the carrier measurement periods are spaced by the jamming periods; and
   c. an emitting antenna from which the interference signal is emitted.

14. The mobile communications terminal disabler of claim 13 further comprising:
   a. a carrier power level detector coupled to the receiving antenna, wherein the power level of each carrier signal is determined, and
   b. a carrier signal detector coupled to the receiving antenna, wherein the carrier power level detector and carrier signal detector are operative during the carrier measurement periods.

15. The mobile communications terminal disabler of claim 14 wherein the carrier signal detector selectively detects one or more predefined channel synchronization a signals.

16. The mobile communications terminal disabler of claim 14 wherein the carrier signal detector selectively detects predefined carrier signals.

17. The mobile communications terminal disabler of claim 13 wherein the frequency and channel synchronization signal of the generator signal may be manually set by a user, and wherein the modulated generator signal may be manually amplified by a user.

* * * * *